(12) United States Patent
Chhabra et al.

(10) Patent No.: US 10,706,159 B2
(45) Date of Patent: Jul. 7, 2020

(54) TECHNOLOGIES FOR DYNAMICALLY PROTECTING MEMORY OF MOBILE COMPUTE DEVICE WITH GEOFENCING

(71) Applicant: Intel Corporation, Santa Clara, CA (US)

(72) Inventors: Siddhartha Chhabra, Hillsboro, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 15/623,318

(22) Filed: Jun. 14, 2017

(65) Prior Publication Data

US 2018/0365432 A1 Dec. 20, 2018

(51) Int. Cl.
| | |
|---|---|
| *G06F 21/60* | (2013.01) |
| *H04W 4/021* | (2018.01) |
| *H04L 29/06* | (2006.01) |
| *H04W 12/08* | (2009.01) |
| *G06F 21/62* | (2013.01) |
| *G06F 21/78* | (2013.01) |
| *H04W 88/02* | (2009.01) |

(52) U.S. Cl.
CPC ........ *G06F 21/602* (2013.01); *G06F 21/6218* (2013.01); *G06F 21/78* (2013.01); *H04L 63/107* (2013.01); *H04W 4/021* (2013.01); *H04W 12/08* (2013.01); *G06F 2221/2111* (2013.01); *H04W 88/02* (2013.01)

(58) Field of Classification Search
CPC .... G06F 21/602; G06F 21/6218; G06F 12/14; G06F 21/00; G06F 21/60; G06F 21/78; H04L 63/107; H04W 4/021; H04W 12/08; H04W 88/02; G10H 1/00
See application file for complete search history.

(56) References Cited

U.S. PATENT DOCUMENTS

| | | | | |
|---|---|---|---|---|
| 4,352,952 | A * | 10/1982 | Boone | G06F 21/72 380/29 |
| 5,773,741 | A * | 6/1998 | Eller | G10H 1/0041 382/187 |
| 6,370,629 | B1 * | 4/2002 | Hastings | G06F 21/6218 711/153 |
| 8,542,833 | B2 * | 9/2013 | Devol | G06F 21/305 380/259 |

(Continued)

*Primary Examiner* — Thanhnga B Truong
(74) *Attorney, Agent, or Firm* — Barnes & Thornburg LLP

(57) ABSTRACT

Technologies for dynamically protecting memory of the mobile compute device include a main memory, a location sensor that produces sensor data indicative of a present location of the mobile compute device, a sensor hub communicatively coupled to the location sensor, and a security engine communicatively coupled to the sensor hub. The sensor hub determines a present location security zone of the mobile compute device based on the present location of the mobile compute device and a geofence policy, which maps locations to location security zones. The security engine encrypts the main memory of the mobile compute device and determines whether the present location security zone has changed relative to a most-previous location security zone of the mobile compute device. If the present location security zone has changed to a safe zone, the security engine decrypts the main memory.

19 Claims, 6 Drawing Sheets

(56) References Cited

U.S. PATENT DOCUMENTS

| | | | |
|---|---|---|---|
| 2011/0138477 A1* | 6/2011 | Jones | G06F 21/78 |
| | | | 726/27 |
| 2012/0166715 A1* | 6/2012 | Frost | G06F 11/1068 |
| | | | 711/103 |
| 2013/0013932 A1* | 1/2013 | Kong | G06F 21/629 |
| | | | 713/189 |
| 2013/0246465 A1* | 9/2013 | Cambridge | H04W 12/08 |
| | | | 707/781 |
| 2014/0325234 A1* | 10/2014 | Shiyafetdinov | H04L 9/0819 |
| | | | 713/182 |
| 2014/0351881 A1* | 11/2014 | Das | G06F 21/00 |
| | | | 726/1 |
| 2015/0381658 A1* | 12/2015 | Poornachandran | H04L 63/20 |
| | | | 726/1 |
| 2016/0357782 A1* | 12/2016 | Jones | G06F 16/29 |
| 2018/0191733 A1* | 7/2018 | Kundu | H04L 63/107 |

* cited by examiner

… (1)

TECHNOLOGIES FOR DYNAMICALLY PROTECTING MEMORY OF MOBILE COMPUTE DEVICE WITH GEOFENCING

BACKGROUND

Data theft on mobile compute devices is becoming a growing concern for many companies and users. There are numerous ways in which systems, such as hardware systems and software systems, of mobile compute devices can be exploited by hardware and software attacks, such as by malicious computer programs that are received over the Internet or other communication networks. For example, low-cost cold-boot and side-channel attacks have been demonstrated as capable of stealing valuable information stored in the memory of mobile compute devices, such as hard-drive encryption keys, personal data, and intellectual property.

To protect the memory of mobile compute device from physical attacks, new technologies like Total Memory Encryption (TME) has been developed. In such technologies, all data directed to off-chip memory, such as dynamic random access memory (DRAM) and non-volatile random access memory (RAM), is encrypted. To provide full security, the entire memory range of the main memory of the mobile compute device is encrypted at all times. However, such encryption strategies can have a negative impact to the overall performance and/or user experience of the mobile compute device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
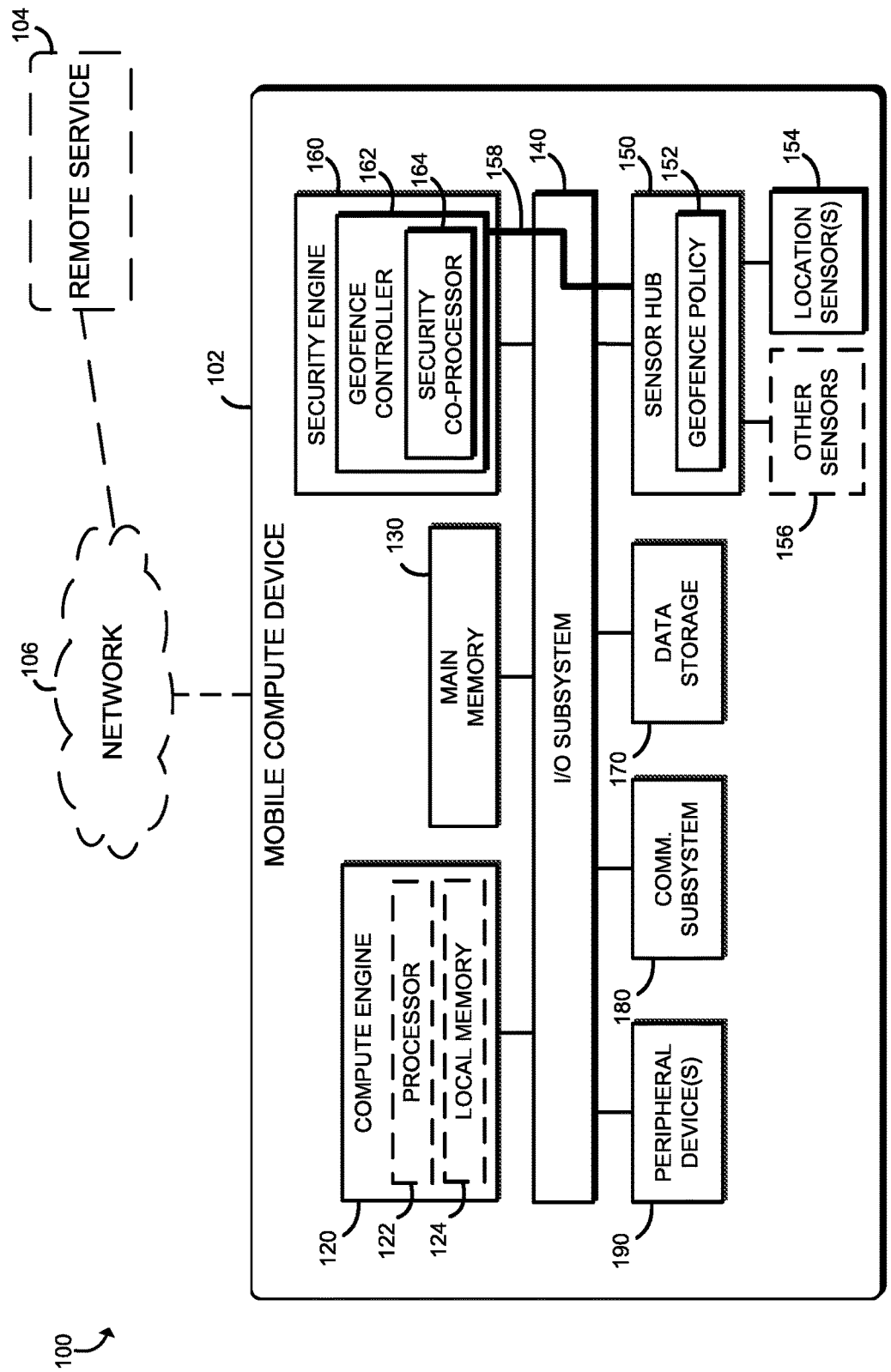
FIG. 1 is a simplified block diagram of at least one embodiment of a system for dynamically protecting a main memory of mobile compute device with geofencing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamically protecting memory of a mobile compute device 102 includes the mobile compute device 102 and, in some embodiments, a remote service 104, which may communicate with the mobile compute device 102 other over a network 106 to provide various services such as a location service. In use, as described in more detail below, the mobile compute device 102 dynamically protects a main memory of the mobile compute device 102 based on a present location of the mobile compute device 102. To do so, the mobile compute device 102 determines a location security zone of the mobile compute device based on the present location of the mobile compute device and a geofence policy 152, which maps locations to location security zones. For example, in the illustrative embodiment, the location security zones include safe zones and unsafe zones, but may include additional granularity in other embodiments. Safe zones are defined as locations considered to be safe or to have a low risk of malicious attacks on, theft to, or physical damage of the mobile compute device 102 (e.g., the user's home or work). Conversely, unsafe zones are defined as locations considered to be unsafe or to have a higher risk of malicious attacks on, theft to, or physical damage of the mobile compute device 102 (e.g., a public location). In some embodiments, any zone or location not located within a safe zone is considered, labeled, or otherwise handled as an unsafe zone. As discussed in more detail below, the mobile compute device 102 is configured to encrypt (or re-encrypt) the main memory of the mobile compute device 102 when the mobile compute device is moved to an unsafe zone and to decrypt the main memory when the mobile compute device 102 is moved to a safe zone. In this way, the performance of the mobile compute device 102 may be increased when operating in the safe zone as continual decryption of data contained in the main memory is not required.

The mobile compute device 102 may be embodied as any type of mobile computer or compute device capable of performing the functions described herein. For example, the mobile compute device 102 may be embodied as a smartphone, a tablet computer, a laptop computer, a notebook, desktop computer, a netbook, an Ultrabook™, a smart device, a personal digital assistant, a mobile Internet device, and/or other mobile compute device. As shown in FIG. 1, the illustrative mobile compute device 102 includes a compute engine 120, a main memory 130, an input/output ("I/O") subsystem 140, a sensor hub 150, a security engine 160, a data storage 170, a communication subsystem 180, and one or more peripheral devices 190. In some embodiments, the compute engine 120 may include or may be embodied as a processor 122 and integrated or separate local memory 124 as discussed below. Additionally, the security engine 160 includes a geofence controller 162 configured to control the geofencing operations (i.e., the encryption/decryption of the main memory 130) as discussed in more detail below. Of course, it should be appreciated that the mobile compute device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the local memory 124, or portions thereof, may be incorporated in the processor 122 in some embodiments.

The compute engine 120 may be embodied as any type of device or collection of devices capable of performing various compute functions as described below. In some embodiments, the compute engine 120 may be embodied as a single device such as an integrated circuit, an embedded system, a field-programmable-array (FPGA), a system-on-a-chip (SOC), or other integrated system or device. Additionally or alternatively, in some embodiments, the compute engine 120 includes or is embodied as the processor 122 and the local memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the local memory 124 may be embodied as any type of volatile or non-volatile memory or data storage capable of performing the functions described herein. In operation, the local memory 124 may store various data and software used during operation of the mobile compute device 102 such as operating systems, applications, programs, libraries, and drivers. The local memory 124 is communicatively coupled to the processor 122 via the I/O subsystem 140, which may be embodied as circuitry and/or components to facilitate input/output operations with the processor 122, the local memory 124, and other components of the mobile compute device 102. For example, the I/O subsystem 140 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 140 may be incorporated, along with the processor 122, the local memory 124, and other components of the mobile compute device 102, into the compute engine 120.

The main memory 130 may be embodied as any type of volatile and/or non-volatile memory or data storage capable of storing data in a persistent and/or non-persistent manner In operation, the main memory 130 may store various data and software used during operation of the mobile compute device 102 such as user data, operational data, operating systems, applications, programs, libraries, and drivers. The main memory 130 is communicatively coupled to the compute engine 120 via the I/O subsystem 140. In some embodiments, the main memory 130 may be embodied as any type of device or devices configured for short-term or long-term storage of data such as, for example, memory devices and circuits, memory cards, or other data storage devices. In some embodiments, the main memory 130 may store valuable information, such as hard-drive encryption keys, personal data, and/or other intellectual property.

The sensor hub 150 may be embodied as any type of device or collection of devices capable of aggregating, integrating, and/or processing data received from such sensors. The sensor hub 150 may be embodied as discrete circuitry or collection or components or as an integrated circuit. For example, in some embodiments, the sensor hub 150 is embodied as a microprocessor, microcontroller unit, coprocessor, digital signal processor (DSP), and/or the like. In the illustrative embodiment, the sensor hub 150 is communicatively coupled to one or more location sensors 154 and, in some embodiments, one or more other sensors 156. The location sensor 154 may be embodied as any type of sensor or circuit capable of producing sensor data indicative of a present location of the mobile compute device 102, such as a Global Positioning System (GPS) circuit, a wireless signal triangulation or trilateration circuit, and/or the other circuit, device, or component capable of generating such data. The other sensors 156 may include any type of additional sensor, which may be incorporated in or communicatively coupled to the mobile compute device 102. The particular type and number of other sensors 156 may depend on, for example, the particular type of mobile compute device 102 and/or its intended functionality.

In use, as discussed in more detail below, the sensor hub 150 is configured to determine a location security zone of the mobile compute device 102 based on the present location of the mobile compute device 102 and a geofence policy 152, which is managed by the sensor hub 150. As discussed above, the geofence policy 152 maps locations of the mobile compute device 102 to location security zones (e.g., safe or unsafe). Moreover, the sensor hub 150 is configured to communicate with a geofence controller 162 of the security engine 160 to control the activation of the geofencing of the main memory 130 (i.e., the turning on/off of the encryption/decryption of the main memory 130) based on the determined location security zone. To do so, the sensor hub 150 is communicatively coupled to the geofence controller 162 via a dedicated interconnect 158. The dedicated interconnect 158 is a hardware connection dedicated solely to communication between the sensor hub 150 and the geofence controller 162.

Figure 2:
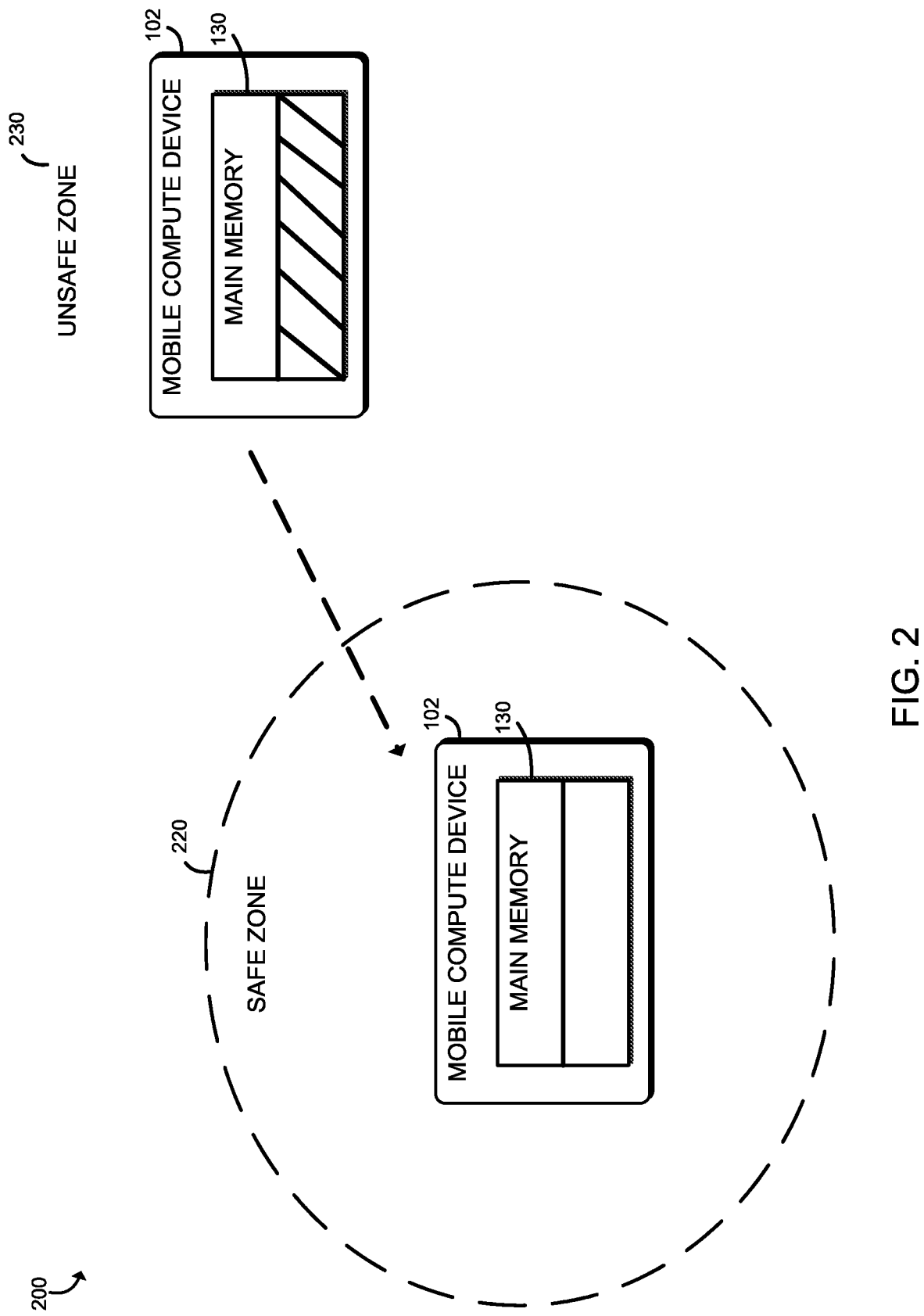
FIG. 2 is a simplified diagram of at least one embodiment of a mobile compute device of FIG. 1 having an encrypted main memory or a decrypted main memory based on the present location security zone of the mobile compute device.

The security engine 160 may be embodied as any type of device or collection of devices capable of performing various security functions on the mobile compute device 102, including encrypting and decryption the main memory 130. In some embodiments, the security engine 160 may be embodied as a dedicated cryptographic engine or processor such as a trusted platform module (TPM) or other security co-processor. In the illustrative embodiment, the security engine 160 includes the geofence controller 162, which is configured to control the encryption/decryption of the main memory 130 by the security engine 160. The geofence controller 162 may be embodied as any type of microprocessor, microcontroller, or other embedded controller capable of controlling the encryption/decryption operations of the security engine 160. For example, in the illustrative embodiment, the geofence controller 162 is embodied as, or otherwise includes, a security co-processor 164. As discussed above, the geofence controller 162 is communicatively coupled to the sensor hub 150 via the dedicated interconnect 158 and is configured to dynamically protect the main memory 130 based on a present location security zone. For example, as shown in FIG. 2, the security engine 160 is configured to encrypt the main memory 130 (shown in hatched in FIG. 2) to protect data stored in the main memory 130 when a present location security zone of the mobile compute device 102 is an unsafe zone 230. However, when the mobile compute device 102 moves into a safe zone 220 from the unsafe zone 230, the security engine 160 decrypts the main memory 130. Of course, the security engine 160 re-encrypts the main memory 130 when the mobile compute device 102 moves out of the safe zone 220 to the same or other unsafe zone 230 (i.e., the present location security zone of the mobile compute device 102 changes from a safe zone 220 to an unsafe zone 230).

Referring back to FIG. 1, the data storage 170 may be embodied as any type of device or devices configured for short-term or long-term storage of data such as, for example, memory devices and circuits, memory cards, hard disk drives, solid-state drives, or other data storage devices. In some embodiments, the data storage 170 may store the geofence policy 152 (or a copy thereof) defining location security zones of the mobile compute device 102.

The communication subsystem 180 may be embodied as any type of communication circuit, device, or collection thereof, capable of enabling communications between the mobile compute device 102 and other devices of the system 100 (e.g., the remote service 104 via the network 106). To do so, the communication subsystem 180 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the mobile compute device 102 may include one or more peripheral devices 190. The peripheral devices 190 may include any number of additional peripheral or interface devices, such as other input/output devices, storage devices, and so forth. The particular devices included in the peripheral devices 190 may depend on, for example, the type and/or configuration of the mobile compute device 102, the remote service 104, and/or services provided by the remote service 104.

The remote service 104 may be embodied as any type of computation or computer device or collection of devices capable of communicating with the mobile compute device 102 over the network 106 to provide various services, such as location services. For example, the remote service 104 may be embodied as, without limitation, a computer, a tablet computer, a smartphone, a laptop computer, a notebook, desktop computer, an Ultrabook™, a smart device, a personal digital assistant, a mobile Internet device, a wearable computing device, a network appliance, a distributed computing system, a processor-based system, a consumer electronic device, and/or other computing device. As such, the remote service 104 may include components, such as a processor, memory, and communication subsystem, similar to those described above in regard to the mobile compute device 102.

The network 106 may be embodied as any number of various wired and/or wireless networks capable of facilitating communications between the mobile compute device 102 and the remote service 104. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 3:
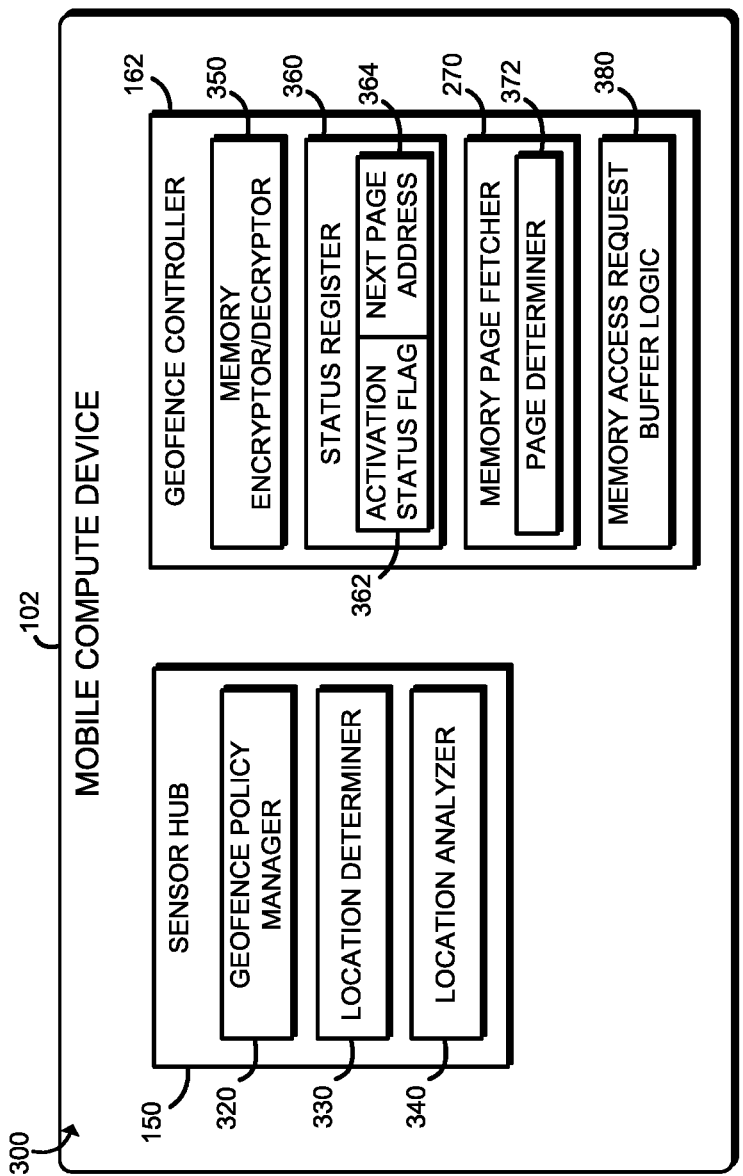
FIG. 3 is a simplified block diagram of at least one embodiment of an environment that may be established by the mobile compute device of FIGS. 1 and 2.

Referring now to FIG. 3, in use, the mobile compute device 102 may establish an environment 300 for protecting the main memory 130 of the mobile compute device 102 based on a present location security zone of the mobile compute device 102. In illustrative environment 300, the sensor hub 150 includes a geofence policy manager 320, a location determiner 330, and a location analyzer 340. Additionally, the geofence controller 162 includes a memory encryptor/decryptor 350, a status register 360, a memory page fetcher 370, and a memory access request buffer logic 380. Some of the components of the environment 300 may be embodied as hardware, firmware, software, or a combination thereof. As such, in some embodiments, one or more of the components of the environment 300 may be embodied as circuitry or collection of electrical devices (e.g., a geofence policy manager circuit 320, a location determiner circuit 330, a location analyzer circuit 340, a memory encryptor/decryptor circuit 350, a status register circuit 360, a memory page fetcher circuit 370, a memory access request buffer logic circuit 380, etc.). It should be appreciated that, in such embodiments, one or more of the geofence policy manager circuit 320, the location determiner circuit 330, the location analyzer circuit 340, the memory encryptor/decryptor circuit 350, the status register circuit 360, the memory page fetcher circuit 370, and/or the memory access request buffer logic circuit 380 may form a portion of one or more of the compute engine 120, the processor 122, the I/O subsystem 140, the communication subsystem 180, and/or other components of the mobile compute device 102. Additionally, in some embodiments, one or more of the illustrative components of the environment 300 may form a portion of another component and/or one or more of the illustrative components may be independent of one another. Further, in some embodiments, one or more of the components of the environment 300 may be embodied as virtualized hardware components or emulated architecture, which may be established and maintained by the compute engine 120 or other components of the mobile compute device 102.

As discussed above, the sensor hub 150 is configured to determine a present location security zone of the mobile compute device 102 based on the present location of the mobile compute device 102. To do so, the sensor hub 150 includes the geofence policy manager 320, the location determiner 330, and the location analyzer 340. The geofence policy manager 320 is configured to manage the geofence policy 152, which maps locations to location security zones. For example, as discussed above, the geofence policy may map GPS coordinates to location security zones, which may include one or more safe zones 220 and one or more unsafe zones 230. As discussed above, safe zones 220 may be defined as those locations at which the mobile compute device 102 has a low risk of malicious attacks, being stolen, or otherwise damaged. In some embodiments, the geofence policy manager 320 may provide a user interface for updating or modifying the geofence policy 152. In such embodiments, the location security zones may be specified as safe or unsafe by the user of the mobile compute device 102. That is, the safe zones 220 may include one or more locations specified by the user as safe, and the unsafe zone 230 may include one or more locations specified by the user as unsafe (e.g., all locations other than the locations specified as safe). For example, the safe zones 220 may include the user's home, school, or work place, and unsafe zones 230 may include locations other than the user's home, school, or work place. Additionally or alternatively, the geofence policy manager 320 may determine a safe zone 220 based on observation that the mobile compute device 102 has not received any attacks while located at a particular location for a predefined period of time. It should be appreciated that, in some embodiments, a machine learning algorithm may be used to define one or more safe zones 220 over time.

The location determiner 330 is configured to determine a present location of the mobile compute device 102. To do so, the location determiner 330 may analyze sensor data generated or otherwise produced by the location sensor 154.

The location analyzer 340 is configured to analyze the present location of the mobile compute device 102 as determined by the location determiner 330 and determine whether the mobile compute device 102 is in a safe zone 220 or an unsafe zone 230. To do so, the location analyzer 340 compares the present location of the mobile compute device 102 to the geofence policy 152 to determine the present location security zone.

As discussed above, the geofence controller 162 is configured to process (i.e., encrypt or decrypt) the main memory 130 of the mobile compute device 102 by determining whether the present location security zone has changed relative to a most-previous location security zone of the mobile compute device 102. To do so, the geofence controller 162 includes the memory encryptor/decryptor 350, the status register 360, the memory page fetcher 370, and the memory access request buffer logic 380.

The memory encryptor/decryptor 350 is configured to encrypt or decrypt the main memory 130 in a page-by-page progression (i.e., one page, followed by the next page, etc.) in response to a determination that the present location security zone has changed relative to a most-previous location security zone of the mobile compute device 102. For example, the memory encryptor/decryptor 350 decrypts the main memory 130 in the page-by-page progression when the present location security zone of the mobile compute device 102 has changed from an unsafe zone 230 to a safe zone 220. If the present location security zone of the mobile compute device 102 changes back to the unsafe zone 230, the memory encryptor/decryptor 350 re-encrypts the main memory 130 in the page-by-page progression. As such, it should be appreciated that the memory encryptor/decryptor 350 may start re-encrypting the main memory 130 before completely decrypting the main memory 130.

The status register 360 may be embodied as any type of data register or memory location of the geofence controller 162 and includes an activation status flag 362 and a next page address 364. The activation status flag 362 indicates the decryption status of the main memory 130 to cause the memory encryptor/decryptor 350 to encrypt or decrypt the main memory 130. For example, in the illustrative embodiment, the sensor hub 150 is configured to set the activation status flag 362 to cause the memory encryptor/decryptor 350 to decrypt the main memory 130 of the mobile compute device 102 in response to a determination that the present location security zone has changed from an unsafe zone to a safe zone. The sensor hub 150 may also clear the activation status flag 362 to cause the memory encryptor/decryptor 350 to re-encrypt the main memory 130 of the mobile compute device 102 in response to a determination that the present location security zone has change from a safe zone to an unsafe zone. As discussed above, the sensor hub 150 is directly and communicatively coupled to the geofence controller 142 via the dedicated interconnect 158. As such, the sensor hub 150 may directly communicate with the status register 360 of the geofence controller 162 over the dedicated interconnect 158, instead of communicating via the I/O subsystem 140, to change the activation status flag 336 of the status register 334.

The next page address 364 is configured to store an address of a next page of main memory 130 to be encrypted or decrypted. As described above, the memory encryptor/decryptor 350 encrypts or decrypts the main memory 130 in the page-by-page progression. As such, the geofence controller 162 stores the memory address of the page of the main memory 130 that is presently being encrypted or decrypted in the next page address 364 to keep track of the progression.

The memory page fetcher 370 is configured to fetch a next page of the main memory 130 to be encrypted or decrypted. To do so, the memory page fetcher 370 includes the page determiner 372 which is configured to determine the memory address of the next page to be encrypted or decrypted. The page determiner 372 is also configured to store the address of the fetched next page of the main memory 130 in the next page address 364 of the status register 360 to keep track of which page of memory is presently being encrypted/decrypted.

The memory access request buffer logic 380 is configured to monitor for a memory request while encrypting or decrypting the main memory 130 in the page-by-page progression. In particular, the memory access request buffer logic 380 is configured to buffer the memory request if the memory request is associated with a memory page that is presently being encrypted or decrypted. As discussed further below, the mobile compute device 102 subsequently performs the buffered memory request when the memory page associated with the memory request is completely encrypted or decrypted.

Figure 4:
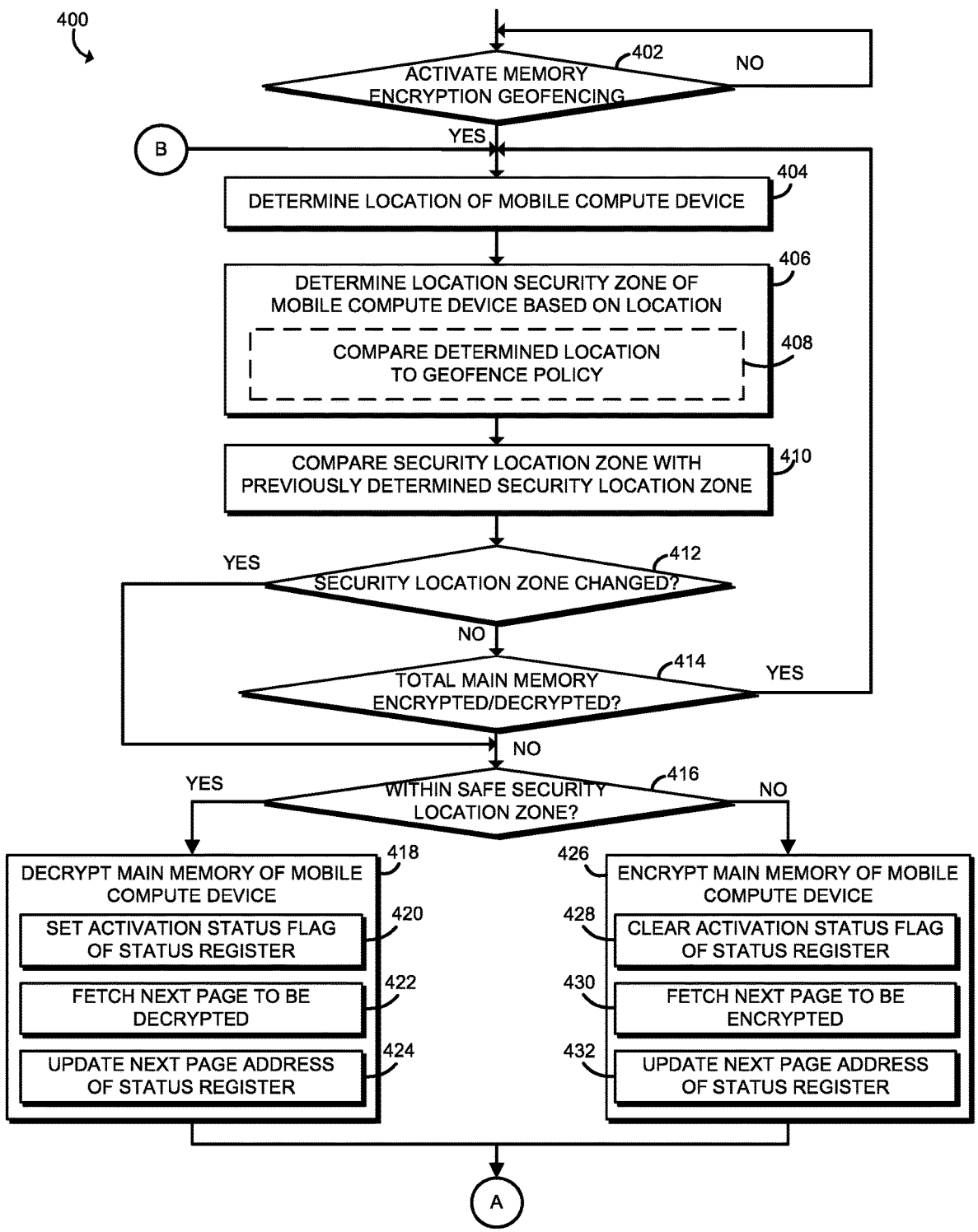
FIGS. 4 and 5 are a simplified flow diagram of at least one embodiment of a method for dynamically protecting main memory that may be executed by the mobile compute device of FIGS. 1-3.
Figure 5:
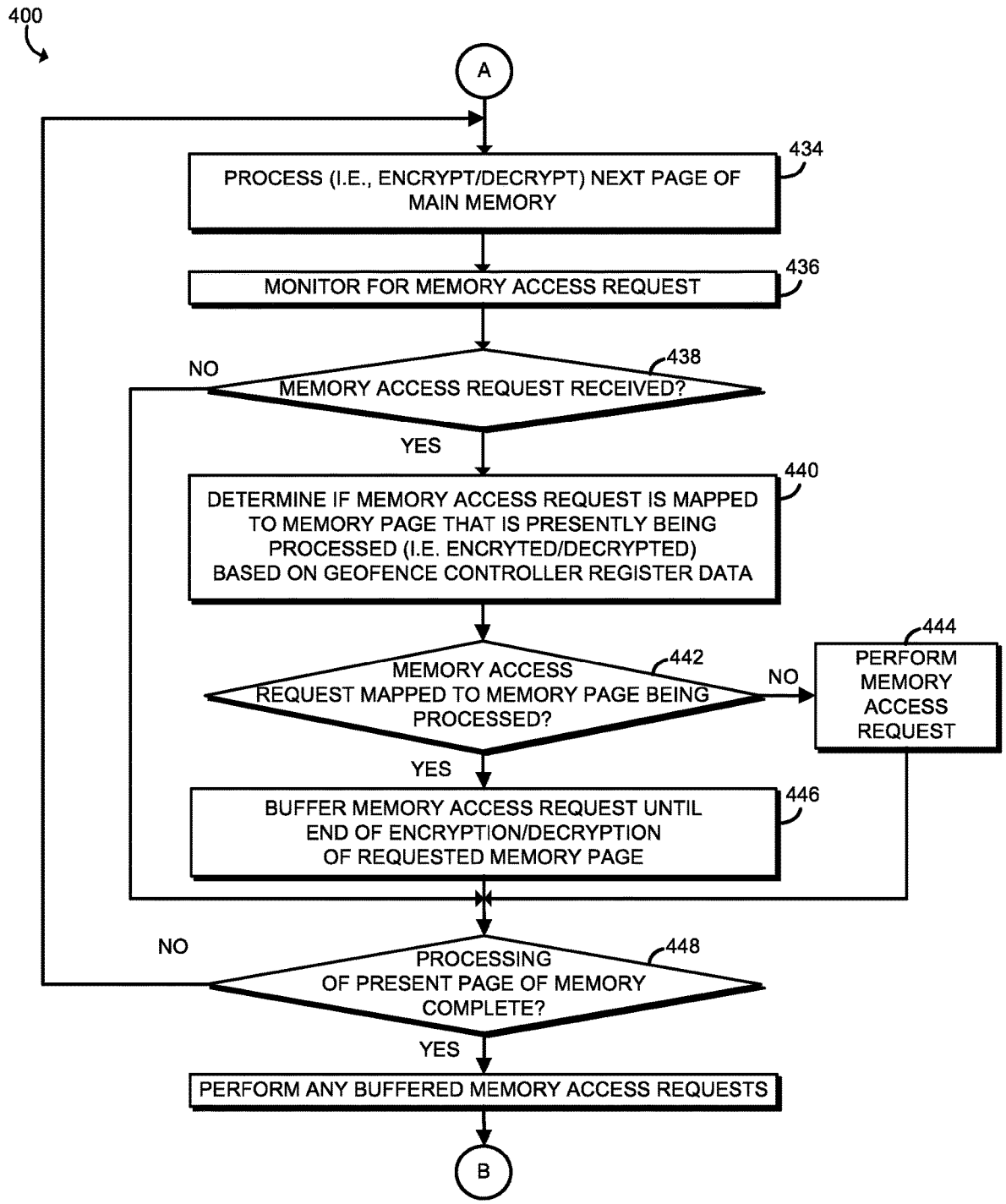

Referring now to FIGS. 4 and 5, in use, the mobile compute device 102 may execute a method 400 for dynamically protecting the main memory 130 of the mobile compute device 102. The method 400 begins with block 402 in which the mobile compute device 102 determines whether to activate a memory encryption geofencing (e.g., a user may selectively turn on/off geofencing in some embodiments). If the mobile compute device 102 determines that activation of the memory encryption geofencing is not desired, the method 400 loops back to block 402 to continue determining whether an activation of the memory encryption geofencing is desired. If, however, the mobile compute device 102 determines to activate the memory encryption geofencing, the method 400 advances to block 404.

In block 404, the sensor hub 150 of the mobile compute device 102 determines the present location of the mobile compute device 102. To do so, the sensor hub 150 may determine the present location based on the sensor data produced by the location sensor 154. Subsequently, in block 406, the sensor hub 150 determines a location security zone of the mobile compute device 102 based on the present location. As discussed above, in the illustrative embodiment, the location security zones include one or more safe zones 220 and one or more unsafe zones 230, and the location security zones and associated locations are stored in the geofence policy 152 managed by the sensor hub 150. As such, in block 408, the sensor hub 150 may compare the determined present location of the mobile compute device 102 to the geofence policy 152 to determine whether the mobile compute device 102 is located in a safe zone or an unsafe zone. As discussed above, in some embodiments, a user of the mobile compute device 102 may predefine one or more locations as safe and locations other than the locations identified as safe are unsafe. For example, the safe location may include the user's home, school, or work place, and unsafe location may include locations other than the user's home, school, or work place.

In block 410, the security engine 160 of the mobile compute device 102 compares the security location zone determined in block 406 with the most-previous security location zone to determine whether the security location zone of the mobile computing device 102 has changed. For example, the security engine 160 determines whether the security location zone of the mobile compute device 102 has changed from an unsafe zone 230 to a safe zone 220, from a safe zone 220 to an unsafe zone 230, or has not changed.

In block 412, the security engine 160 determines whether the security location zone has changed. If the security engine 160 determines that the security location zone has changed, the method 400 advances to block 416 discussed below. If, however, the security engine 160 determines that the security location zone has not changed, the method 400 advances to block 414. In block 414, the security engine 160 determines whether the main memory 130 is completely decrypted or encrypted. That is, the security engine 160 confirms whether the processing (i.e., decrypting or encrypting) of the main memory 130 has been completed. If so, the method 400 loops back to block 404 to continue determining the present location of the mobile compute device 102. If, however, the security engine 160 determines that the main memory 130 is not fully encrypted or decrypted (i.e., the processing of the main memory is not completed), the method 400 advances to block 416.

In block 416, the security engine 160 further determines whether the present security location zone is a safe zone 220. For example, the security engine 160 may determine whether the mobile compute device 102 has moved from a location within an unsafe zone 230 to a location within the safe zone 220.

If the security engine 160 determines that the present location security zone of the mobile compute device 102 is a safe zone 220, the method 400 advances to block 418. In block 418, the security engine 160 decrypts the main memory 130 of the mobile compute device 102 in a page-by-page progression. To do so, in block 420, the security engine 160 sets the activation status flag 362 of the status register 360 to indicate that the main memory 130 is to be decrypted (if the activation status flag 362 has not already been set). In block 422, the security engine 160 fetches the next page of the main memory 130 to be decrypted and updates the next page address 364 in block 424 with the address of the fetched page. The method 400 subsequently advances to block 434 of FIG. 5 discussed below.

Referring back to block 416, if the security engine 160 determines that the present location security zone of the mobile compute device 102 is an unsafe zone 230, the method 400 advances to block 426. In block 426, the security engine 160 encrypts the main memory 130 of the mobile compute device 102 in a page-by-page progression. To do so, in block 528, the security engine 160 clears the activation status flag 362 of the status register 360 to indicate that the main memory 130 is to be encrypted (if the activation status flag 362 has not already been cleared). In block 430, the security engine 160 fetches the next page of the main memory 130 to be encrypted and updates the next page address 364 in block 432 with the address of the fetched page. The method 400 subsequently advances to block 434 of FIG. 5 discussed below.

In block 434 of FIG. 5, the security engine 160 processes (i.e., encrypts or decrypts) the main memory 130 depending on the status of the activation status flag 362. In block 436, the security engine 160 monitors for a memory access request to the main memory 130 of the mobile compute device 102. That is, the security engine 160 monitors for memory access while the present page of memory is being processed (i.e., encrypted or decrypted).

In block 438, the security engine 160 determines whether a memory access request has been received. If the security engine 160 determines that a memory access request has not been received, the method 400 advances to block 448 discussed below. If, however, the security engine 160 determines that the memory access request has been received, the method 400 advances to block 440.

In block 440, the security engine 160 determines if the memory access request is mapped to the memory page that is presently being processed (i.e., encrypted or decrypted). To do so, the security engine 160 may compare the memory address of the memory access request to the memory address stored in the next page address 364 of the status register 360. As discussed above, the next page address 364 stores the address of the memory page presently being processed (i.e., encrypted or decrypted).

In block 442, the security engine 160 determines whether the memory access request is mapped to the memory page that is presently being processed. If the security engine 160 determines that the memory access request is not mapped to the memory page that is presently being processed, the method 400 advances to block 444 in which the requested memory access is performed. The method 400 subsequently advances to block 448 discussed below. If, however, the security engine 160 determines that the memory access request is mapped to the memory page that is presently being processed, the method 400 advances to block 446.

In block 446, the security engine 160 buffers the memory access request until the end of the encryption or decryption of the requested memory page associated with the memory access request. As such, in block 448, the security engine 160 determines whether the processing of the present page of main memory 130 has been completed. That is, the security engine 160 determines whether the present page has been encrypted or decrypted based on the status of the activation status flag of the status register 360. If not, the method 400 loops back to block 434 in which the processing (i.e., decrypting or encrypting) of the present page of main memory 130 continues.

If, however, the processing of the present page of main memory 130 has been completed, the method 400 advances to block 450 in which any buffered memory access requests are completed. The method 400 subsequently loops back to block 404 of FIG. 4 in which the location of the mobile compute device 102 is again determined. As such, the method 400 flows through blocks 404-412 to determine whether the security location zone of the mobile compute device has changed and, if not, whether the main memory has been completely encrypted or decrypted in block 414. If the main memory has not yet been completely encrypted or decrypted, the method advances to block 416 and either block 418 or 426 to process the next page of the main memory. In this way, the security engine 160 encrypts or decrypts the main memory in a page-by-page progression, while monitoring for memory accesses to pages presently being processed. It should be appreciated that such page-by-page progression will be halted and re-processed should the present location security zone of the mobile compute device 102 change before the main memory 130 is completely processed (i.e., completely encrypted or decrypted).

Figure 6:
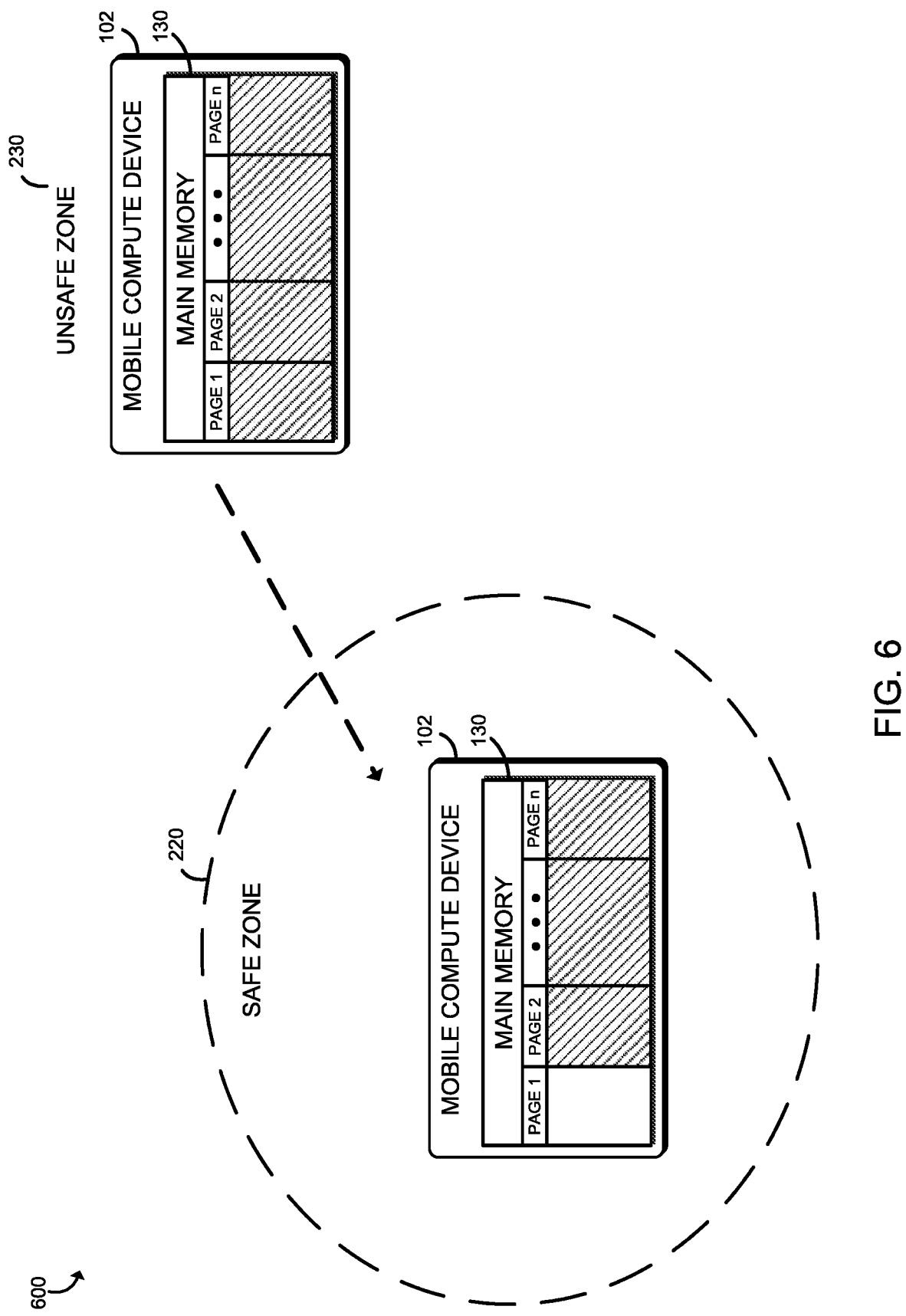
FIG. 6 is a simplified diagram of at least one embodiment of the mobile compute device of FIGS. 1-3 in which the main memory is encrypted or decrypted in a page-by-page progression based on the present location security zone of the mobile compute device.

Referring now to FIG. 6, an illustrative main memory 130 of the mobile compute device 102 is shown. As discussed above, the main memory 130 of the mobile compute device 102 is dynamically protected based on the present location of the mobile compute device 102 and the geofence policy 152 indicative of a mapping between locations to location security zones.

When the mobile compute device 102 is positioned outside of a safe zone 220 (i.e., the unsafe zone 230), the activation status flag 362 of the status register 360 of the mobile compute device 102 is cleared and the main memory 130 of the mobile compute device 102 is encrypted. As shown in FIG. 6, the total main memory 130 (i.e., all memory pages) of the mobile compute device 102 is encrypted (shown in FIG. 6 via hatched markings).

However, when the mobile compute device 102 moves into a safe zone 220 from the unsafe zone 230 as indicated by the dashed arrow in FIG. 6, the activation status flag 362 of the status register 360 of the mobile compute device 102 is set and the main memory 130 of the mobile compute device 102 is decrypted. As shown in FIG. 6, the encrypted main memory 130 of the mobile compute device 102 is being decrypted in the page-by-page progression. In the illustrative embodiment, the main memory 130 is being decrypted in an increasing order from PAGE 1 to PAGE n of the main memory 130, with PAGE 1 having been completely decrypted. However, in some embodiments, the main memory 130 may be decrypted in a decreasing order from PAGE n down to PAGE 1 of the main memory 130 or in some other order. When the mobile compute device 102 moves back out to the unsafe zone 230, the activation status flag 362 of the status register 360 of the mobile compute device 102 again cleared and the main memory 130 of the mobile compute device 102 is re-encrypted in the page-by-page progression.

EXAMPLES

Illustrative examples of the technologies disclosed herein are provided below. An embodiment of the technologies may include any one or more, and any combination of, the examples described below.

Example 1 includes a mobile compute device for dynamically protecting memory of the mobile compute device. The mobile compute device includes a main memory; a location sensor to produce sensor data indicative of a present location of the mobile compute device; and a sensor hub communicatively coupled to the location sensor, wherein the sensor hub is to determine a present location security zone of the mobile compute device based on the present location of the mobile compute device and a geofence policy managed by the sensor hub, wherein the geofence policy maps locations to location security zones; and a security engine communicatively coupled to the sensor hub, wherein the security engine is to (i) encrypt the main memory, (ii) determine whether the present location security zone has changed relative to a most-previous location security zone of the mobile compute device, and (iii) decrypt the main memory of the mobile compute device in response to a determination the present location security zone has changed and is a safe zone.

Example 2 includes the subject matter of Example 1, and wherein the security engine is further to re-encrypt the main memory of the mobile compute device in response to a determination that the present location security zone of the mobile compute device has changed again and is an unsafe zone.

Example 3 includes the subject matter of Example 1 or 2, and wherein to determine the present location security zone comprises to determine whether the mobile compute device is presently in a safe zone or an unsafe zone based on the present location of the mobile compute device and the geofence policy.

Example 4 includes the subject matter of any of Examples 1-3, and wherein the security engine includes a status register, and wherein the sensor hub is to set an activation status flag of the status register of the security engine to cause the security engine to decrypt the main memory.

Example 5 includes the subject matter of any of Examples 1-4, and further comprising a dedicated interconnect that communicatively couples the sensor hub to the security engine, wherein to set the activation status flag comprises to communicate with the security engine over the dedicated interconnect to set the activation status flag of the status register of the security engine.

Example 6 includes the subject matter of any of Examples 1-5, and wherein to decrypt the main memory of the mobile compute device comprises to decrypt the main memory of the mobile compute device in a page-by-page progression.

Example 7 includes the subject matter of any of Examples 1-6, and wherein to decrypt the main memory of the mobile compute device in a page-by-page progression comprises to fetch a next page of main memory to be decrypted; store an address of the next page in a status register of the security engine; and decrypt the next page of the main memory of the mobile compute device.

Example 8 includes the subject matter of any of Examples 1-7, and wherein the security engine is further to monitor for a memory request while decrypting the next page of the main memory; determine whether the memory request is associated with the next page; and buffer the memory request while the next page of the main memory is being decrypted in response to a determination that the memory request is associated with the next page.

Example 9 includes the subject matter of any of Examples 1-8, and wherein the mobile compute device is to perform the memory request associated with the next page in response to a determination that the next page has been decrypted.

Example 10 includes the subject matter of any of Examples 1-9, and wherein the security engine is to re-encrypt the main memory in a page-by-page progression in response to a determination that the present location security zone of the mobile compute device has changed again and is an unsafe zone.

Example 11 includes the subject matter of any of Examples 1-10, and wherein to re-encrypt the main memory in a page-by-page progression comprises to fetch another next page of main memory to be re-encrypted; store an address of the another next page in a status register of the security engine; and decrypt the another next page of the main memory.

Example 12 includes the subject matter of any of Examples 1-11, and wherein the security engine is further to monitor for a memory request while re-encrypting the another next page of the main memory; determine whether the memory request is associated with the another next page; and buffer the memory request while the another next page of the main memory is being re-encrypted in response to a determination that the memory request is associated with the another next page.

Example 13 includes the subject matter of any of Examples 1-12, and wherein the mobile compute device is to perform the memory request associated with the another next page in response to a determination that the another next page has been re-encrypted.

Example 14 includes a method for dynamically protecting main memory of a mobile compute device, the method comprising encrypting, by the mobile compute device, the main memory; determining, by the mobile compute device, a present location of the mobile compute device; determining, by the mobile compute device, a present location security zone of the mobile compute device based on the present location of the mobile compute device and a geofence policy, wherein the geofence policy maps locations to location security zones; determining, by the mobile compute device, whether the present location security zone has changed relative to a most-previous location security zone of the mobile compute device; and decrypting, by the mobile compute device, the main memory of the mobile compute device in response to a determination the present location security zone has changed and is a safe zone.

Example 15 includes the subject matter of Example 14, and further comprising re-encrypting the main memory of the mobile compute device in response to a determination that the present location security zone of the mobile compute device has changed again and is an unsafe zone.

Example 16 includes the subject matter of Examples 14 or 15, and wherein determining the present location of the mobile compute device comprises determining a present location of the mobile compute device based on sensor data received from a location sensor of the mobile compute device.

Example 17 includes the subject matter of any of Examples 14-16, and wherein determining the present location security zone comprises determining whether the mobile compute device is presently in a safe zone or an unsafe zone based on the present location of the mobile compute device and the geofence policy.

Example 18 includes the subject matter of any of Examples 14-17, and wherein determining the present location security zone comprises determining, by a sensor hub of the mobile compute device, a present location security zone of the mobile compute device based on the present location of the mobile compute device and a geofence policy maintained by the sensor hub.

Example 19 includes the subject matter of any of Examples 14-18, and wherein decrypting the main memory of the mobile compute device comprises decrypting, by a security engine of the mobile compute device, the main memory in response to the determination the present location security zone has changed and is a safe zone.

Example 20 includes the subject matter of any of Examples 14-19, and wherein decrypting the main memory of the mobile compute device comprises setting, by a sensor hub of the mobile compute device, an activation status flag of a status register of the security engine.

Example 21 includes the subject matter of any of Examples 14-20, and wherein setting the activation status flag comprises communicating, by the sensor hub, with the security engine over a dedication interconnect.

Example 22 includes the subject matter of any of Examples 14-21, and wherein decrypting the main memory of the mobile compute device comprises decrypting, by a security engine of the mobile compute device, the main memory of the mobile compute device in a page-by-page progression.

Example 23 includes the subject matter of any of Examples 14-22, and wherein decrypting the main memory of the mobile compute device in a page-by-page progression comprises fetching, by the security engine, a next page of main memory to be decrypted; storing, by the security engine, an address of the next page in a status register of the security engine; and decrypting, by the security engine, the next page of the main memory of the mobile compute device.

Example 24 includes the subject matter of any of Examples 14-23, and further comprising monitoring, by the mobile compute device, for a memory request while decrypting the next page of the main memory of the mobile compute device; determining, by the security engine, whether the memory request is associated with the next page; and buffering, by the security engine, the memory request while decrypting the next page of the main memory in response to a determination that the memory request is associated with the next page.

Example 25 includes the subject matter of any of Examples 14-24, and further comprising performing the memory request associated with the next page in response to a determination that the next page has been decrypted.

Example 26 includes the subject matter of any of Examples 14-25, and further comprising re-encrypting, by the security engine, the main memory of the mobile compute device in a page-by-page progression in response to a determination that the present location security zone of the mobile compute device has changed again and is an unsafe zone.

Example 27 includes the subject matter of any of Examples 14-26, and wherein re-encrypting the main memory of the mobile compute device in a page-by-page progression comprises fetching, by the security engine, another next page of main memory to be re-encrypted; storing, by the security engine, an address of the another next page in a status register of the security engine; and decrypting, by the security engine, the another next page of the main memory of the mobile compute device.

Example 28 includes the subject matter of any of Examples 14-27, and further comprising monitoring, by the mobile compute device, for a memory request while re-encrypting the another next page of the main memory of the mobile compute device; determining, by the security engine, whether the memory request is associated with the another next page; and buffering, by the security engine, the memory request while re-encrypting the another next page of the main memory in response to a determination that the memory request is associated with the another next page.

Example 29 includes the subject matter of any of Examples 14-28, and further comprising performing the memory request associated with the another next page in response to a determination that the another next page has been re-encrypted.

Example 30 includes one or more machine-readable storage media comprising a plurality of instructions stored thereon that, when executed, causes a mobile compute device to perform the method of any of Examples 14-29.

Example 31 includes a mobile compute device for dynamically protecting memory of the mobile compute device, the mobile compute device comprising means for encrypting the main memory; means for determining a present location of the mobile compute device; means for determining a present location security zone of the mobile compute device based on the present location of the mobile compute device and a geofence policy, wherein the geofence policy maps locations to location security zones; means for determining whether the present location security zone has changed relative to a most-previous location security zone of the mobile compute device; and means for decrypting the main memory of the mobile compute device in response to a determination the present location security zone has changed and is a safe zone.

Example 32 includes the subject matter of Example 31, and further comprising means for re-encrypting the main memory of the mobile compute device in response to a determination that the present location security zone of the mobile compute device has changed again and is an unsafe zone.

Example 33 includes the subject matter of Examples 31 or 32, and wherein the means for determining the present location of the mobile compute device comprises means for determining a present location of the mobile compute device based on sensor data received from a location sensor of the mobile compute device.

Example 34 includes the subject matter of any of Examples 31-33, and wherein the means for determining the present location security zone comprises means for determining whether the mobile compute device is presently in a safe zone or an unsafe zone based on the present location of the mobile compute device and the geofence policy.

Example 35 includes the subject matter of any of Examples 31-33, and wherein the means for determining the present location security zone comprises means for determining a present location security zone of the mobile compute device based on the present location of the mobile compute device and a geofence policy maintained by the sensor hub.

Example 36 includes the subject matter of any of Examples 31-33, and wherein the means for decrypting the main memory of the mobile compute device comprises means for decrypting the main memory in response to the determination the present location security zone has changed and is a safe zone.

Example 37 includes the subject matter of any of Examples 31-33, and wherein the means for decrypting the main memory of the mobile compute device comprises means for setting an activation status flag of a status register of the security engine.

Example 38 includes the subject matter of any of Examples 31-33, and wherein the means for setting the activation status flag comprises means for communicating with the security engine over a dedication interconnect.

Example 39 includes the subject matter of any of Examples 31-33, and wherein the means for decrypting the main memory of the mobile compute device comprises means for decrypting the main memory of the mobile compute device in a page-by-page progression.

Example 40 includes the subject matter of any of Examples 31-33, and wherein the means for decrypting the main memory of the mobile compute device in a page-by-page progression comprises means for fetching a next page of main memory to be decrypted; means for storing an address of the next page in a status register of the security engine; and means for decrypting the next page of the main memory of the mobile compute device.

Example 41 includes the subject matter of any of Examples 31-33, and further comprising means for monitoring for a memory request while decrypting the next page of the main memory of the mobile compute device; means for determining whether the memory request is associated with the next page; and means for buffering the memory request while decrypting the next page of the main memory in response to a determination that the memory request is associated with the next page.

Example 42 includes the subject matter of any of Examples 31-33, and further comprising means for performing the memory request associated with the next page in response to a determination that the next page has been decrypted.

Example 43 includes the subject matter of any of Examples 31-33, and further comprising means for re-encrypting the main memory of the mobile compute device in a page-by-page progression in response to a determination that the present location security zone of the mobile compute device has changed again and is an unsafe zone.

Example 44 includes the subject matter of any of Examples 31-33, and wherein the means for re-encrypting the main memory of the mobile compute device in a page-by-page progression comprises means for fetching another next page of main memory to be re-encrypted; means for storing an address of the another next page in a status register of the security engine; and means for decrypting the another next page of the main memory of the mobile compute device.

Example 45 includes the subject matter of any of Examples 31-33, and further comprising means for monitoring for a memory request while re-encrypting the another next page of the main memory of the mobile compute device; means for determining whether the memory request is associated with the another next page; and means for buffering the memory request while re-encrypting the another next page of the main memory in response to a determination that the memory request is associated with the another next page.

Example 46 includes the subject matter of any of Examples 31-33, and further comprising means for performing the memory request associated with the another next page in response to a determination that the another next page has been re-encrypted.

The invention claimed is:
1. A mobile compute device for dynamically protecting memory of the mobile compute device, the mobile compute device comprising:
a main memory;
a location sensor to produce sensor data indicative of a present location of the mobile compute device; and
a sensor hub communicatively coupled to the location sensor, wherein the sensor hub is to determine a present location security zone of the mobile compute device based on the present location of the mobile compute device and a geofence policy managed by the sensor hub, wherein the geofence policy maps locations to location security zones; and a security engine communicatively coupled to the sensor hub, wherein the security engine is to (i) encrypt the main memory, (ii) determine whether the present location security zone has changed relative to a most-previous location security zone of the mobile compute device, and (iii) decrypt the main memory of the mobile compute device in a page-by-page progression in response to a determination the present location security zone has changed and is a safe zone;

wherein to decrypt the main memory of the mobile compute device in a page-by-page progression comprises to (i) fetch a next page of main memory to be decrypted; (ii) store an address of the next page in a status register of the security engine; and (iii) decrypt the next page of the main memory of the mobile compute device.

2. The mobile compute device of claim 1, wherein to determine the present location security zone comprises to determine whether the mobile compute device is presently in a safe zone or an unsafe zone based on the present location of the mobile compute device and the geofence policy.

3. The mobile compute device of claim 1, wherein the security engine includes a status register, and wherein the sensor hub is to set an activation status flag of the status register of the security engine to cause the security engine to decrypt the main memory.

4. The mobile compute device of claim 3, further comprising a dedicated interconnect that communicatively couples the sensor hub to the security engine, wherein to set the activation status flag comprises to communicate with the security engine over the dedicated interconnect to set the activation status flag of the status register of the security engine.

5. The mobile compute device of claim 1, wherein the security engine is further to:

monitor for a memory request while decrypting the next page of the main memory;

determine whether the memory request is associated with the next page; and buffer the memory request while the next page of the main memory is being decrypted in response to a determination that the memory request is associated with the next page.

6. The mobile compute device of claim 5, wherein the mobile compute device is to perform the memory request associated with the next page in response to a determination that the next page has been decrypted.

7. The mobile compute device of claim 6, wherein the security engine is to re-encrypt the main memory in a page-by-page progression in response to a determination that the present location security zone of the mobile compute device has changed again and is an unsafe zone.

8. A method for dynamically protecting main memory of a mobile compute device, the method comprising:

encrypting, by the mobile compute device, the main memory;

determining, by the mobile compute device, a present location of the mobile compute device;

determining, by the mobile compute device, a present location security zone of the mobile compute device based on the present location of the mobile compute device and a geofence policy, wherein the geofence policy maps locations to location security zones;

determining, by the mobile compute device, whether the present location security zone has changed relative to a most-previous location security zone of the mobile compute device; and decrypting, by a security engine of the mobile compute device, the main memory of the mobile compute device in a page-by-page progression in response to a determination the present location security zone has changed and is a safe zone;

wherein decrypting the main memory of the mobile compute device in a page-by-page progression comprises:

fetching, by the security engine, a next page of main memory to be decrypted;

storing, by the security engine, an address of the next page in a status register of the security engine; and decrypting, by the security engine, the next page of the main memory of the mobile compute device.

9. The method of claim 8, wherein determining the present location security zone comprises determining, by a sensor hub of the mobile compute device, a present location security zone of the mobile compute device based on the present location of the mobile compute device and a geofence policy maintained by the sensor hub.

10. The method of claim 8, wherein decrypting the main memory of the mobile compute device comprises decrypting, by a security engine of the mobile compute device, the main memory in response to the determination the present location security zone has changed and is a safe zone.

11. The method of claim 10, wherein decrypting the main memory of the mobile compute device comprises communicating, by the sensor hub, with the security engine over a dedication interconnect to set a status flag of a status register of the security engine.

12. The method of claim 8, further comprising:

monitoring, by the mobile compute device, for a memory request while decrypting the next page of the main memory of the mobile compute device;

determining, by the security engine, whether the memory request is associated with the next page; and buffering, by the security engine, the memory request while decrypting the next page of the main memory in response to a determination that the memory request is associated with the next page.

13. The method of claim 12, further comprising re-encrypting, by the security engine, the main memory of the mobile compute device in a page-by-page progression in response to a determination that the present location security zone of the mobile compute device has changed again and is an unsafe zone.

14. One or more non-transitory, machine-readable storage media comprising a plurality of instructions stored thereon that, when executed, causes a mobile compute device to:

encrypt the main memory;

determine a present location of the mobile compute device;

determine a present location security zone of the mobile compute device based on the present location of the mobile compute device and a geofence policy, wherein the geofence policy maps locations to location security zones;

determine whether the present location security zone has changed relative to a most-previous location security zone of the mobile compute device; and decrypt, by a security engine of the mobile compute device, the main memory of the mobile compute device in a page-by-page progression in response to a determination the present location security zone has changed and is a safe zone;

wherein to decrypt the main memory of the mobile compute device in a page-by-page progression comprises to:

fetch, by the security engine, a next page of main memory to be decrypted;

store, by the security engine, an address of the next page in a status register of the security engine; and decrypt, by the security engine, the next page of the main memory of the mobile compute device.

15. The one or more non-transitory, machine-readable storage media of claim 14, wherein to determine the present location security zone comprises to determine a present location security zone of the mobile compute device based on the present location of the mobile compute device and a geofence policy maintained by a sensor hub of the mobile compute device.

16. The one or more non-transitory, machine-readable storage media of claim 14, wherein to decrypt the main memory of the mobile compute device comprises to decrypt the main memory in response to the determination the present location security zone has changed and is a safe zone.

17. The one or more non-transitory, machine-readable storage media of claim 16, wherein to decrypt the main memory of the mobile compute device comprises to communicate, by the sensor hub, with the security engine over a dedication interconnect to set a status flag of a status register of the security engine.

18. The one or more non-transitory, machine-readable storage media of claim 14, wherein the plurality of instructions, when executed, further causes the mobile compute device to:

monitor for a memory request while decrypting the next page of the main memory of the mobile compute device;

determine whether the memory request is associated with the next page; and buffer the memory request while decrypting the next page of the main memory in response to a determination that the memory request is associated with the next page.

19. The one or more non-transitory, machine-readable storage media of claim 18, wherein the plurality of instructions, when executed, further causes the mobile compute device to re-encrypt the main memory of the mobile compute device in a page-by-page progression in response to a determination that the present location security zone of the mobile compute device has changed again and is an unsafe zone.

* * * * *